United States Patent
Vyakaranam et al.

(10) Patent No.: US 9,267,030 B2
(45) Date of Patent: Feb. 23, 2016

(54) COMPOSITIONS HAVING PHOSPHORUS-CONTAINING COMPOUNDS

(75) Inventors: Kamesh Vyakaranam, Pearland, TX (US); Mark B. Wilson, Clute, TX (US); Endre Szuromi, Lake Jackson, TX (US); Michael J. Mullins, Houston, TX (US)

(73) Assignee: Blue Cube IP LLC, Midland, MI (US)

( * ) Notice: Subject to any disclaimer, the term of this patent is extended or adjusted under 35 U.S.C. 154(b) by 758 days.

(21) Appl. No.: 13/575,617

(22) PCT Filed: Jan. 26, 2011

(86) PCT No.: PCT/US2011/000146
§ 371 (c)(1),
(2), (4) Date: Sep. 6, 2012

(87) PCT Pub. No.: WO2011/094004
PCT Pub. Date: Aug. 4, 2011

(65) Prior Publication Data
US 2013/0005857 A1    Jan. 3, 2013

Related U.S. Application Data

(60) Provisional application No. 61/299,746, filed on Jan. 29, 2010.

(51) Int. Cl.
*H01B 3/40* (2006.01)
*C08L 63/04* (2006.01)
*C08G 59/40* (2006.01)

(52) U.S. Cl.
CPC ............. *C08L 63/04* (2013.01); *C08G 59/4014* (2013.01)

(58) Field of Classification Search
CPC .................................................... C08L 63/00
USPC ......................................... 528/398; 523/451
See application file for complete search history.

(56) References Cited

U.S. PATENT DOCUMENTS

| 4,157,324 | A | 6/1979 | Culbertson | |
| 5,112,932 | A | 5/1992 | Koenig et al. | |
| 5,157,080 | A | 10/1992 | Gardner et al. | |
| 6,645,631 | B2 | 11/2003 | Gan et al. | |
| 8,691,932 | B2 * | 4/2014 | Mullins et al. | 528/167 |
| 2003/0003305 | A1 * | 1/2003 | Japp et al. | 428/413 |
| 2010/0240816 | A1 * | 9/2010 | Liao et al. | 524/384 |
| 2011/0136993 | A1 * | 6/2011 | Worku et al. | 525/523 |
| 2012/0302727 | A1 * | 11/2012 | Mullins et al. | 528/398 |
| 2013/0041116 | A1 * | 2/2013 | Mullins et al. | 525/523 |

FOREIGN PATENT DOCUMENTS

| EP | 0806429 | 11/1997 |
| JP | 64-079216 | 3/1989 |
| JP | 2002-128996 | 5/2002 |
| WO | 2005118604 | 12/2005 |

OTHER PUBLICATIONS

International Search Report and Written Opinion from related PCT application PCT/US2011/000146, dated Sep. 19, 2011, 12 pages.
International Preliminary Report on Patentability from related PCT application PCT/US2011/000146, dated Jul. 5, 2012, 13 pages.

* cited by examiner

*Primary Examiner* — Megan McCulley (57) ABSTRACT

Embodiments of the present disclosure provide a composition that includes a phosphorous-containing compound, a cyanate ester, an epoxy resin, and a maleimide. For the various embodiments, a viscosity of the composition increases less than 100% as measured by Gardner Bubble Viscosity a temperature of 23° C. in at least 3 days. For the various embodiments, the composition of the present disclosure can also include an aprotic solvent, such as a ketone. Embodiments of the present disclosure further include a composition that includes the phosphorous-containing compound, the cyanate ester, and the aprotic solvent. For the various embodiments, the composition can also include the epoxy resin and the maleimide. For the various embodiments, the composition does not include an aliphatic alcohol.

8 Claims, 2 Drawing Sheets

COMPOSITIONS HAVING PHOSPHORUS-CONTAINING COMPOUNDS

This application is a National Stage application under 35 U.S.C. 371 of PCT/US2011/000146, filed on Jan. 26, 2011 and published as WO2011/094004 A2 on Aug. 4, 2011, which claims the benefit of U.S. Provisional Application Ser. No. 61/299,746 filed Jan. 29, 2010, the entire contents of which are incorporated herein by reference in its entirety.

TECHNICAL FIELD

The present disclosure relates generally to compositions and in particular to compositions having phosphorous-containing compounds.

BACKGROUND

Synthetic resins are widely used in both industrial and consumer electronics because of, among other things, their chemical resistance, mechanical strength and electrical properties. For example, synthetic resins can be used in electronics as protective films, adhesive materials and/or insulating materials, such as interlayer insulating films. To be useful for these applications, the synthetic resins need to provide ease of handling and certain necessary physical, thermal, electrical insulation and moisture resistance properties. For example, synthetic resins having a low dielectric constant, a high solubility and a low moisture uptake as well as a high glass transition temperature (Tg) can be desirable combination of properties for electrical applications.

The use of synthetic resins in electronic applications can also influence the electrical signals generated in the electronics. Increases in electrical signal frequency in an electronic system (e.g., a computer system) allows for data to be processed at a higher rate. Synthetic resins in the vicinity of such electrical signals, however, can exert a large influence on transmission loss of such electrical signals in a high frequency circuit. To minimize this influence, synthetic resins having a low dielectric constant and a low dissipation factor, in addition to the other properties discussed above, are desired.

Synthetic resins, however, can be flammable. As such, different approaches have been made to impart flame resistance to synthetic resins. Two main approaches have been taken to providing flame resistance. The first is a "Green" approach in which halogen-free compounds are used. The second approach makes use of halogen compounds. Halogenated compounds have been used for decades in the electronic industry to impart flame resistance to electrical and electronic assemblies. For example, tetrabromobisphenol-A (TBBA) has been a workhorse flame resistance in electrical laminates for many years. Halogenated compounds, however, are now being scrutinized by environmental groups due to the possibility of brominated dioxin formation during the incineration of electronic components at their end of life. In many developed countries the burning of the components is regulated and controlled, however, in developing countries, burning is often unregulated, increasing the likelihood of brominated dioxin release into the atmosphere.

SUMMARY

Embodiments of the present disclosure provide a composition that includes a phosphorous-containing compound, a cyanate ester, and an epoxy resin. For the various embodiments, the composition can also include a maleimide. For the various embodiments, a viscosity of the composition increases less than 100% as measured by Gardner Bubble Viscosity at a temperature of 23° C. in at least 3 days. For the various embodiments, the composition of the present disclosure can also include an aprotic solvent, such as a ketone.

Embodiments of the present disclosure further include a composition that includes the phosphorous-containing compound, the cyanate ester, and the aprotic solvent. For the various embodiments, the composition can also include the epoxy resin and a maleimide. For the various embodiments, a Masterblend compound can be formed with the epoxy resin and the maleimide, where the Masterblend compound can then be used in the composition of the present disclosure.

For the various embodiments, the composition does not include an aliphatic alcohol.

For the various embodiments, the phosphorous-containing compound of the composition is from a reaction of at least one organophosphorus compound having a group selected from the group consisting of H—P=O, P—H and P—OH; and at least one compound having the following Formula (I):

$$[R'(Y)_{m'}]_m(X-O-R'')_n \quad \text{Formula (I)}$$

wherein R' is an organic group; Y is a functional group selected from the group consisting of hydroxy, carboxylic acid, carboxylate, acid anhydride, amine, —SH, —SO$_3$H, —CONH$_2$, —NHCOOR, phosphinate, phosphate and combinations thereof; X is a hydrocarbylene group; R" is a hydrogen or a hydrocarbyl group having from 1 to 8 carbon atoms, R is alkyl or aryl group having from 1 to 12 carbon atoms; and m', m and n are, independently, numbers equal to or greater than 1.

For the various embodiments, the composition of the present disclosure can be used to prepare a laminate. Additional embodiments of the present disclosure include a method of forming the composition of the present disclosure. For the various embodiments, the method includes removing an aliphatic alcohol from the reaction products that include the phosphorous-containing compound, and forming a mixture of the phosphorous-containing compound with a cyanate ester in an aprotic solvent.

DETAILED DESCRIPTION

Embodiments of the present disclosure include compositions that are useful in the preparation of prepregs (incompletely cured resin on a reinforcing fabric), laminates (fully cured resin on a reinforcing fabric usually prepared by stacking and heating prepregs), and related items such as resin coated copper that can be used for preparing printed circuit boards and interconnect (IC) substrates. Compositions of the present disclosure provide the advantage of being halogen free while acting as a flame retardant for cured compositions formed with at least a portion of the composition. Such cured compositions of the present composition can also have suitable thermal and electrical properties useful as protective films, adhesive materials and/or insulating materials in a variety of electronic applications.

The embodiments of the compositions of the present disclosure include phosphorous-containing compounds that do not contain and/or include an aliphatic alcohol (e.g., primary and/or secondary alcohols). As discussed herein, the presences of an aliphatic alcohol with the phosphorous-containing compounds and/or in the composition of the present disclosure resulted in less than a desirable viscosity stability for the compositions and a less than desirable glass transition temperature (Tg) from the resulting cured composition of the compositions. For the various embodiments, a less than desirable viscosity stability can occur when there is a change in the viscosity of the composition of over 100% as measured by Gardner Bubble Viscosity at a temperature of 23° C. in less than 24 hours after initially mixing the composition of the present disclosure. By removing the aliphatic alcohol from the phosphorous-containing compounds prior to forming the compositions of the present disclosure there can be improvements in thermomechanical properties, such as improvements in glass transition temperature of a cured composition as compared to compositions that do not remove the aliphatic alcohols. In addition, such compositions also exhibited significantly improved viscosity stability over compositions that do not remove the aliphatic alcohols.

The present disclosure also describes the preparation of the compositions using Masterblend reactions of maleimide components (with and without the phosphorous-containing compounds) with epoxy resins at elevated temperatures and the further use of these Masterblend compounds, as will be discussed herein, for homogeneous formulations useful for the applications discussed herein. The laminates prepared from these formulations with fillers, additives and toughening aids showed excellent thermal properties and were classified as V-0 (UL 94 Flammability Classification, UL®) from the IC substrate standards. Compositions of the present disclosure may be useful in composite, aero-space, and electronic assembly applications, among other applications.

For the various embodiments, the composition of the present disclosure includes a phosphorous-containing compound, a cyanate ester, and an epoxy resin. For the various embodiments, a viscosity of the composition increases less than 100% as measured by Gardner Bubble Viscosity at a temperature of 23° C. in at least 3 days. In additional embodiments of the present disclosure, the composition includes the phosphorous-containing compound, the cyanate ester, and an aprotic solvent. Compositions of the present disclosure, however, do not include an aliphatic alcohol.

For the various embodiments, the phosphorous-containing compound used in the compositions of the present disclosure is from a reaction of at least one organophosphorus compound having a group selected from the group consisting of H—P=O, P—H and P—OH and at least one compound having the following Formula (I):

Formula (I)

wherein R' is an organic group; Y is a functional group selected from the group consisting of hydroxy, carboxylic acid, carboxylate, acid anhydride, amine, —SH, —SO$_3$H, —CONH$_2$, —NHCOOR, phosphinate, phosphate and combinations thereof; X is a hydrocarbylene group; R" is a hydrogen or a hydrocarbyl group having from 1 to 8 carbon atoms, R is alkyl or aryl group having from 1 to 12 carbon atoms; and m', m and n are, independently, numbers equal to or greater than 1.

For the various embodiments, reaction products that include the phosphorous-containing compound used in the present disclosure are discussed in a PCT Patent Application entitled "Phosphorus-Containing Compounds Useful For Making Halogen-Free, Ignition-Resistant Polymers" to Joseph Gan and having the International Publication Number WO 2005/118604 (International Application No. PCT/US2005/017954) and is incorporated herein by reference in its entirety. In WO 2005/118604, the reaction products that include the phosphorous-containing compound used in the embodiments of the present disclosure are obtained from the reaction between at least one of the organophosphorus compound, herein referred to as Component (A), and the compound of Formula (I), herein referred to as Component (B). These reaction products include the phosphorous-containing compound, which is referred to herein as Compound (I). Compound (I) contains a phosphorus element in its chemical structure making it useful as a raw material for preparing flame resistant materials. Compound (I) also has an active hydrogen group making it useful as a reactive starting material for reacting with other polymers. For example, Compound (I) may contain active hydrogen groups such as hydroxyl groups which makes it reactive with epoxy resins. In this embodiment, Compound (I) can be considered as a crosslinking agent, curing agent or hardener for an epoxy resin.

Compound (I) generally has a phosphorous content of at least 2 weight-percent (wt. %) and preferably at least 4 wt. % making it useful, among other things, as a flame retardant material. Compound (I) is preferably substantially free of bromine atoms, and more preferably substantially free of halogen atoms.

In Formula (I), each (—X-0-R") group may be bonded to the same or different atom in the R' group. In one embodiment, each (—X-0-R") group can be bonded to a different atom in the R' group. The X is a hydrocarbylene group that can have from 1 to 8 carbon atoms, and more preferably from 1 to 4 carbon atoms, and even more preferably 1 or 2 carbon atoms, such as methylene, ethylene, propylene, isopropylene, butylene, and isobutylene. Methylene is the most preferred X group.

The R" group may be a hydrogen atom or a hydrocarbyl group having from 1 to 8 carbon atoms, preferably from 1 to 6 carbon atoms, and more preferably at least 1 to 4 carbon atoms. The hydrocarbyl group is preferably an alkylene group, such as methyl, ethyl, propyl, isopropyl, butyl, isobutyl, pentyl, hexyl, heptyl, and octyl. Most preferred for the R" group are methyl, ethyl, n-butyl and iso-butyl.

The R' group preferably comprises at least one arylene group and optionally at least one hydrocarbylene group or hydrocarbylene ether group. The R' group more preferably comprises at least two aromatic groups linked to each other by a hydrocarbylene group or hydrocarbylene ether group. The aromatic groups are preferably phenyl groups and the hydrocarbylene group is preferably the X group as defined above, most preferably a methylene group and the hydrocarbylene ether is preferably a methylene oxy group.

The Y group is a functional group capable of reacting with an epoxy group, an ethoxy group or a propoxy group. The Y functional groups are preferably selected from hydroxyl (—OH), carboxylic acid (—C(=O)OH), carboxylate (—C(=O)OR'''), carboxylic acid anhydride, a primary or a secondary amine (—NH$_2$, —NHR'''' or =NH, wherein "=" refers to two covalent bonds to the same or different atoms of the R' group), —SH, —SO$_3$H, —CONH$_2$, —NHCOOR, and phosphinates (HO—P[R"]$_2$=O), or phosphites (H—P[OR"]$_2$=O). For the various embodiments, the Y functional group is preferably hydroxyl.

The R''' group may be an alkali metal, such as Na+ or K+, or a hydrocarbyl group having up to 8 carbon atoms, preferably up to 4 carbon atoms, and more preferably up to 2 carbon atoms, such as methyl, ethyl, propyl, isopropyl, butyl, isobutyl.

The R'''' group is hydrogen or a hydrocarbyl group, such as an aryl group, an alkyl group, or an alkaryl group, which preferably has up to 20 carbon atoms, more preferably up 15 to 12 carbon atoms, and even more preferably up to 4 carbon atoms.

The carboxylic acid anhydride is preferably selected from substituted or unsubstituted succinic anhydride, maleic anhydride and phthalic anhydride. Each substituent, when present, is one or more hydrogen atoms or hydrocarbyl group, such as an alkyl group preferably having up to 12 carbon atoms, and more preferably, up to 4 carbon atoms.

The hydroxyl, carboxylic acid and carboxylic acid anhydride functionalities are preferred for the R'''' group, with the hydroxyl functionality being most preferred.

The preferred compounds of Formula (I) are those compounds that meet the Formula (I), [R'(Y)$_{m'}$]$_m$(X-O-R'')$_n$, where at least one (X-O-R'') group is in the middle of the backbone of the chemical structure. For example, preferred compounds include those that contain at least two (X-O-R'') groups on at least one of the same R'(Y)$_{m'}$ groups. In addition, the compounds that are useful in the present disclosure include, for example, those that meet the following criteria: (a) n is preferably greater than m; or (b) when n is equal 1, then m must be greater than 3 and at least one (X-O-R'') group is in the middle of the backbone of the chemical structure; or (c) when m is equal to 1, then n must be greater than 1; or (d) when n is equal to 2, then at least one of the (X-O-R'') groups must be in the middle of the backbone of the chemical structure.

In Formula (I), m' is preferably less than 10, m is preferably less than 100, and n is preferably less than 200.

Preferred compounds of Formula (I) may be represented by the following Formula (II):

[Ar(Y)$_{m'}$—X']$_a$[Ar(Y)$_{m'}$—X]$_b$(X—O—R'')$_n$    Formula (II)

wherein each Ar group independently is an aromatic group, preferably a phenyl group, optionally substituted with one or more groups, preferably selected from alkyl, alkoxy, and alkanol, having 1 to 4 carbon atoms (for example, methyl, methoxy, methanol, ethyl, ethoxy, ethanol, propyl, propoxy, propanol, isopropyl, isopropanol, butyl, butoxy, butanol) such as, for example, a tolylene and/or xylene group; at least one of the (X—O—R'') groups is on at least one of the Ar groups; "n", "m'", "X", "Y", and "R''" have the same meaning as in Formula (I); "X'" each independently may be X, X—O—X, or X—O—X—O—X; "a" and "b" each independently represent a number equal to or greater than zero, but both cannot be zero.

In Formula (II), "a" is preferably up to 100, "b" is up to 100 and "n" is preferably up to 200.

Another preferred compound of Formula (I) may be represented by the following Formula (III):

(R''-O-X)$_c$[Ar(Y)$_{m'}$—X-0-X]$_a$[Ar(Y)$_{m'}$—
  X]$_b$[Ar(Y)$_{m'}$]$_b$(X—O—R'')$_d$    Formula (III)

wherein "Ar", "m'", "a", "b", "X", "Y", and "R''" have the same meaning as in Formula (II); subscripts "b'", "c" and "d" each independently represent a number equal to or greater than zero. In Formula (III), "c" is preferably up to 200 and "d" is preferably up to 200.

The Y groups are preferably bonded directly to an Ar group. Examples of preferred "Ar (Y)" include phenol, cresol, and xylenol, and the corresponding divalent counterparts thereof.

The (X-0-R'') group in each unit with the subscripts "c" and "d" having a value greater than zero is bonded directly to a member of an "Ar" group of another unit in Formula (III), which has the same or different unit formula.

The units with the subscripts "a", "b", and "b'" may be present in any order in a random or block configuration. Each of subscripts "a", "b", "b'", "c" and "d" independently are preferably at least 1. Each of subscripts "a", "b", "b'", "c" and "d" independently are preferably zero, more preferably at least 1, and even more preferably at least 5; yet more preferably at least 10 and preferably not greater than 1000, and more preferably not greater than 100. In one embodiment, the subscripts "a", "b", "b'", "c" and "d" independently are preferably not greater than 50, more preferably not greater than 30, and even more preferably not greater than 10.

Another preferred compound of Formula (I) may be represented by the following Formula (IV):

Formula (IV)

So, in arriving at the compound of Formula (IV), the compound of Formula (I) has R' being an organic group that consists of 2,2-diphenylpropane groups bridged by methylenes, Y being —OH, X being methylene, R'' being n-butyl, m' being 4, m being about 2, and n being about 10. The reaction product of Formula (IV) with a tricyclic phosphonate known as DOP (6H-dibenz[c,e][1,2]oxaphosphorin, 6-oxide) according to the method of Gan (WO 2005/118604 incorporated herein by reference in its entirety) will be referred to as "DOP-BN."

In a preferred embodiment, the compounds of Formula (III), that is Component (B), may be prepared by first reacting (a) phenols, cresols, xylenols, biphenol-A, and/or other alkyl phenols and (b) formaldehyde, to form one or more monomeric, dimeric or higher condensation products. Subsequently, the condensation products resulting from reacting (a) and (b) above are modified by etherification, either partially or fully etherified, with at least one monomeric alcohol. The monomeric alcohol is ROH wherein R is the same as defined above for Formula (I). Examples of the resultant etherified products which can be used as Component (B), are for example etherified resole resins such as those described in U.S. Pat. Nos. 4,157,324, and 5,157,080.

Component (B) made by the above reaction of (a) and (b) preferably contains low amounts of the starting raw materials such phenol, cresol, bisphenol A and formaldehyde as residual monomers in the reaction product (that is Component (B)) for example less than 3 wt. %, preferably less than 2 wt. % and more preferably less than 1 wt. %.

It is preferable to use etherified resoles over non-etherified resoles as Component (B) in the present disclosure because etherified resoles are more storage stable at room temperature (about 25° C.) whereas non-etherified resoles have a tendency to undergo self condensation; and at elevated temperature, typically greater than 25° C., preferably greater 100° C. and more preferably greater 150° C. and even more preferably greater than 170° C., and generally less than 250° C. and preferably less than 220° C. resoles have tendency to undergo self condensation rather than to react with the phosphorous compounds of Component (A). Thus, for the present disclosure, it is advantageous to select etherified resoles as Component (B) that have a lower tendency to undergo self condensation and that tend to favor the main condensation reaction with Component (A) for example via the alkyl group R".

The number average molecular weight of the compounds of Formulas (I) to (III) is preferably at least 50, more preferably at least 200, and even more preferably at least 500; and is preferably not greater than 10,000, more preferably not greater than 8,000, and even more preferably not greater than 5,000. The weight average molecular weight is preferably at least 100, more preferably at least 400, and even more preferably 1,000; and is preferably not greater than 15,000, more preferably not greater than 3,000, and even more preferably not greater than 1,500.

Component (B) is preferably substantially free of bromine atoms, and more preferably substantially free of halogen atoms.

Examples of suitable etherified resole for use as Component (B) include butyl ether bisphenol-A resoles, which are made with bisphenol A, formaldehyde and n-butanol. The etherified resole are typically a mixture of monomeric, dimeric and oligomeric structures. Examples of commercially available etherified resoles include SANTOLINK™ EP 560, which is a butyl etherified phenol formaldehyde condensation product and PHENODUR™ VPR 1785/50, which is a butoxymethylated phenol novolac, which the manufacturer characterizes as a highly butyl etherified resole based on a cresol mixture with a weight average molecular weight from 4,000 to 6,000 and a polydispersity from 2 to 3. Both of these products are available from UCB Group, a company headquartered in Brussels, Belgium, and its affiliate, UCB GmbH & Co. KG, a company incorporated in Germany. Other resole compounds available from UCB include for example PHENODUR™ PR 401, PHENODUR™ PR 411, PHENODUR™ PR 515, PHENODUR™ PR 711, PHENODUR™ PR 612, PHENODUR™ PR 722, PHENODUR™ PR 733, PHENODUR™ PR 565, and PHENODUR™ VPR 1775.

Other resole compounds are available from Bakelite, which include for example BAKELITE™ PF 0751 LA, BAKELITE™ PF 9075 DF, BAKELITE™ 9900LB, BAKELITE™ 9435 LA, BAKELITE™ 0746 LA, BAKELITE™ 0747 LA, BAKELITE™ 9858 LG, BAKELITE™ 9640 LG, BAKELITE™ 9098LB, BAKELITE™ 9241 LG, BAKELITE™ 9989 LB, BAKELITE™ 0715 LG, BAKELITE™ 7616 LB, and BAKELITE™ 7576 LB.

An example of the butyl ether bisphenol-A resole is shown below in Formula (V):

Formula (V)

where Bu is a butyl group and m can be an integer of 1 to about 10, and z is about 2. As discussed herein, the butyl ether bisphenol-A resole may be present as a combination of monomers, dimers and/or oligomers of the butyl ether bisphenol-A resole.

In addition, one or more of the butyl ether groups ($-CH_2OBu$) in the ortho positions in the butyl ether bisphenol-A resole can be replaced with other groups, such as $-H$, and $-CH_2OH$. The above structure is a simplification of the actual structure. As is well known in the art, some of the bridging groups can be $-CH_2OCH_2-$ rather than methylene bridges. This can be controlled by the process parameters used to make the resole (catalyst type, pH, alcohol concentration, and temperature among others).

Organophosphorus-Containing Compounds, Component (A)

The organophosphorus-containing compound, Component (A), may be selected from compounds having a group selected from H—P=O, P—H, and P—OH where each single "—" of the groups or each "—" of "=" referring to a bond between the phosphorus atom "P" and an organic moiety. The phosphorus atom may be bonded to two separate organic moieties or may be bonded to one organic moiety. When bonded to one organic moiety, the bonds may connect with the same atom of the organic moiety to form a double bond or, preferably, may be single bonds connecting the phosphorus atom with different atoms in the same organic moiety.

The organophosphorus-containing compound preferably corresponds to the following Formulas (VI) through (XVIII):

Formula (VI)

Formula (VII)

Formula (VIII)

Formula (IX)

$R^A PH_2$     Formula (X)

$(R^A O)_2 P(O)H$     Formula (XI)

$R^A P(O)(OH)H$     Formula (XII)

$R^A P(O)(OH)_2$     Formula (XIII)

$R^A R^B P(O)$     Formula (XIV)

$(R'')_2 P(O)H$     Formula (XV)

$(R'')_2 P(O)H$     Formula (XVI)

$R''P(O)(OH)H$     Formula (XVII)

$R''P(O)(OH)_2$     Formula (XVIII)

wherein the $R^A$ group and the $R^B$ group may be the same or different and are selected from substituted or unsubstituted aryl or aryloxy groups and hydroxyl groups provided that not more than one of the $R^A$ group and the $R^B$ group is a hydroxyl group, and the $R^C$ group and the $R^D$ group may be the same or different and are selected from hydrocarbylene and hydrocarbenzylene. The $R^C$ group and the $R^D$ group are preferably each independently, more preferably both, an arylene group.

Phenylphosphine is an example of Formula (X), diphenyl or diethyl phosphite or dimethylphosphite is an example of Formula (XI), phenylphosphinic acid $(C_6H_5)P(O)(OH)H$ is a an example of Formula (XII), phenylphosphonic acid $(C_6H_5)P(O)(OH)_2$ is an example of Formula (XIII), and dimethylphosphinic acid $(CH_3)_2P(O)OH$ is an example of Formula (XIV).

In a preferred embodiment, the organophosphorus-containing compound, Component (A), corresponds to one of the following chemical Formulae (XIX) to (XXIV):

Formula (XIX)

Formula (XX)

Formula (XXI)

Formula (XXII)

Formula (XXIII)

Formula (XXIV)

wherein each $R^1$ to $R^8$ is, independently, a hydrogen atom or a hydrocarbyl group that optionally may contain one or more heteroatoms such as O, N, S, P, or Si, provided that not more than 3 of $R^1$ to $R^4$ are hydrogen atoms and two or more of $R^1$ to $R^8$ may be joined to one another to form one or more cyclic groups. The total number of carbon atoms in $R^1$ to $R^8$ is preferably in the range from 6 to 100.

In a more preferred embodiment, the organophosphorus-containing compound, Component (A), corresponds to the following Formula (XXV):

Formula (XXV)

wherein $R^9$ represents H and each $R^{10}$ independently represents a hydrogen atom or a hydrocarbyl group that optionally may contain one or more heteroatoms such as O, N, S, P, or Si. Two or more of $R^{10}$ may be joined to one another to form one or more cyclic groups.

The above preferred embodiment organophosphorus-containing compounds are described in more detail in EP 0806429 entitled "Flame-retardant epoxy resins and flame retarders for epoxy resins."

The organophosphorus-containing compound, Component (A), is preferably 9,10-dihydro-9-oxa-10-phosphaphenanthrene-10-oxide (also known as "DOP"), such as "Sanko-HCA", which is commercially available from Sanko of Japan, or "Struktol Polydis™ PD 3710", which is commercially available from Schill & Seilacher of Germany; dimethylphosphite, diphenylphosphite, ethylphosphonic acid, diethylphosphinic acid, methyl ethylphosphinic acid, phenyl phosphonic acid, phenyl phosphinic acid, dimethylphosphinic acid, phenylphosphine, vinyl phosphoric acid; or mixtures thereof.

The organophosphorus-containing compound, Component (A), is preferably substantially free of bromine atoms, more preferably substantially free of halogen atoms.

Reaction of Component (A) with Component (B) to Form Compound (I)

To prepare Compound (I), Component (A) and Component (B) are first blended or mixed together to form a reactive composition. Then a sufficient temperature is applied to the reactive composition of Components (A) and (B) to initiate the reaction between the two components to form Compound (I).

For example, Component (A) can be mixed with Component (B) in a reaction vessel and the mixture is heated at an elevated temperature which is a temperature that is preferably below the decomposition temperature of the starting materials. Generally, the reaction temperature is greater than 25° C., preferably greater than 150° C., and more preferably greater than 170° C. The reaction is preferably carried out for a period of time sufficient to a react the H—P=O, P—H, or P—OH moieties of Component (A) with the OR" moieties of Component (B). The time of reaction is typically from 30 minutes to 20 hours, preferably from 1 hour to 10 hours, and more preferably from 2 hours to 6 hours.

The reaction of the present disclosure is preferably carried out without the presence of water (generally the water is present in less than 5 weight percent, more preferable less than 3 weight percent and most preferable less than 1 weight percent) because water may tend to react with Component (A).

Removal of alcohol and other volatile byproducts such as other solvents formed as a byproduct of this reaction generally helps drive the reaction to completion. The pressure in the reaction vessel is therefore preferably reduced to a pressure below atmospheric pressure, such as a pressure of 0.1 bar or less, to help drive off the alcohol or byproducts at a temperature below the above-mentioned lowest decomposition temperature. The reaction vessel may optionally be purged with a gas or volatile organic liquid to further assist in removing byproduct(s). The gas or volatile organic liquid is preferably inert to the contents of the reaction vessel. An example of such an inert gas includes, but is not limited to, nitrogen gas.

Component (B) is usually dissolved in an organic solvent, such as butanol, xylene, or DOWANOL PM (trademark of The Dow Chemical Company); and part of the solvent can be removed either by heat or applying vacuum to the solution before the addition of Component (A). The order of charging of Component (A) and Component (B) into the reaction mixture is not important.

Components (A) and (B) are preferably combined at a weight ratio in the range from 10:1 to 1:10, preferably from 5:1 to 1:5, more preferably from 2:1 to 1:2, most preferably in the range from 1.1:1 to 1:1.1 based on total solids content of the composition.

If desired, other materials such as catalysts or solvents may be added to the reaction mixture of Component (A) and (B).

The phosphorous-containing product of the present disclosure, Compound (I), resulting from the reaction between Component (A) and Component (B) has a phosphorus content of preferably at least 4 weight-percent, and more preferably at least 6 weight-percent. The phosphorus content of Compound (I) generally ranges from 4 to 12 percent, preferably from 5 to 9 and more preferably from 6 to 8 weight percent. Component (I) is preferably substantially free of bromine atoms, and more preferably substantially free of halogen atoms.

Compound (I) has a Mettler softening point generally greater than 100° C. and preferably greater than 120° C.; and preferably less than 250° C. and more preferably less than 200° C. The product is preferably a solid at room temperature (about 25° C.) for better storing, shipping and handling.

As discussed herein, the reaction products that include the phosphorous-containing compound used in the embodiment of the present disclosure are obtained from the reaction between at least one of the organophosphorus compounds (Component (A)) and compound of Formula (I) (Component (B)). Generally, the resulting Compound (I) from the reaction of Components (A) and (B) may be a blend of one or more of different oligomers.

In addition to including the phosphorous-containing compound, the reaction products can also include additional compounds. Such compounds include solvents used in forming Compound (I) and aliphatic alcohols such as primary alcohols and secondary alcohols, which are either present in the reaction composition that contains the reaction products and/or which are produced and/or are volatilized during a drying process. Aliphatic alcohols are organic compounds containing one or more hydroxyl groups [—OH] attached to an alkyl radical (e.g., derivatives of alkanes where one or more hydrogens have been replaced by hydroxyl groups). Examples of such aliphatic alcohols include n-butanol, isobutanol, ethanol, and methanol, among other primary alcohols and secondary alcohols.

As discussed above, aliphatic alcohols and other volatile byproducts formed in making the reaction products can be removed so as to help drive the reaction to completion. However, in order for the formulations of the present invention to exhibit adequate stability, it is necessary to use unusual methods to reduce the concentration of alcohols to less than 1 wt. % of the reaction products. For the various embodiments, such unusual methods can include heating the reaction products under vacuum (<0.1 bar) at a temperature of at least 50° C. The time required to reduce the concentration of alcohols to less than 1 wt. % will be dependant on the amount of reaction products being dried and the configuration of the drier, but a time of at least 1 hour is possible, which a time of at least 16 hours being preferred. Adequate results can be achieved on a small (<100 g) scale in a static system such as a vacuum oven. Another method is to heat the reaction products with flowing nitrogen (air is less preferred) in a way that the nitrogen filters through the reaction products and removes entrained alcohols. In both cases it is desirable to stir the reaction products (either the solid and/or the liquid that results from melting the solid at >100° C. by tumbling or other mechanical methods.) A wiped-film evaporator might also be used.

In a thermogravimetric trace analysis it was found that weight loss from DOP-BN continues at temperatures up to 170° C. For example, after 45 minutes at 170° C. an additional 2 wt. % is lost from DOP-BN. Analysis of evolved gases from the DOP-BN by a pyrolysis mass spectroscopy indicates that n-butanol is the primary component. This extraordinarily slow loss of alcohol at temperatures well above the boiling point (n-butanol boils at 117° C. at 1 bar) is likely due to chemistry that makes subtle changes to the composition and liberates butanol. This shows that unusual conditions are necessary to 'dry' DOP-BN.

For the various embodiments, this process of drying the reaction products so as to form the dry solid ensures that essentially all, if not completely all, of the aliphatic alcohols that are present in reaction products and/or that are produced during the drying process are removed from the phosphorous-containing compound used in the composition of the present disclosure. As a result of the drying process, the phosphorous-containing compound of the present disclosure includes no aliphatic alcohol components. As such, the compositions of the present disclosure do not include an aliphatic alcohol.

For the various embodiments, removing the aliphatic alcohols from the phosphorous-containing compound helps to improve both the viscosity stability of the composition of the present disclosure and the glass transition temperature of a cured composition that includes the phosphorous-containing compound of the present disclosure.

For the various embodiments, in forming the composition of the present disclosure the dry solid of the phosphorous-containing compound is brought into solution with an aprotic solvent. An aprotic solvent is a solvent that cannot donate hydrogen and can be either polar or non-polar. For the various embodiments, an example of an aprotic solvent includes ethers, esters, ketones, dimethylformamide, dimethyl sulfoxide, toluene, xylene, and combinations thereof. Examples of suitable ethers are selected from the group consisting of tetrahydrofuran, dioxane, glyme (1,2-dimethoxyethane), diglyme, and combinations thereof. Examples of suitable ketone are selected from the group consisting of acetone, cyclohexanone, methyl ethyl ketone, methyl isobutyl ketone and combinations thereof.

For the various embodiments, the amount of aprotic solvent used to bring the phosphorous-containing compound into solution can be kept to a minimum level that is sufficient to dissolve the phosphorous-containing compound, but that also provides a desired viscosity for the desired application for the composition. For example, the viscosity of the composition can be determined by the end use of the composition, such as for a prepreg preparation, as provided herein. For the various embodiments, preferred amounts of aprotic solvent used in the composition can include 70 wt. % (wt solvent/wt total formulation) or less of the composition, more preferred 60 wt. % or less of the composition, and most preferred is 55 wt. % or less of the composition. However, for preparation of thin films such as resin coated copper, higher solvent concentrations as high as about 95 wt. % or less of the composition are possible.

For the various embodiments, the composition of the present disclosure also includes a cyanate ester. Examples of suitable cyanate esters include, but are not limited to, a partially trimerized cyanate ester, a triazine cyanate ester (e.g., cyanate ester partially trimerized into a triazine ring structure). Specific examples of suitable cyanate esters are the dicyanates (or polycyanates) of the following bisphenols and polyphenols: bisphenol A, bisphenol F (4,4'-bis(hydroxyphenyl)methane, bisphenol S (4,4'-bis(hydroxyphenyl)sulfone, dicyclopentadiene bisphenol, naphthalene diol, 4,4'-dihydroxybiphenyl, 4,4'-dihydroxy-3,3',5,5'-tetramethylbiphenyl, phenol novolac, cresol novolac, naphthol novolac, and combinations thereof. For the various embodiments, the partially trimerized cyanate ester and/or the triazine cyanate ester are soluble in the aprotic solvent (e.g., ketones such as methyl ethyl ketone, methyl isobutyl ketone and combinations thereof) used with the phosphorous-containing compound of the composition. Commercially available cyanates include Primaset® BA-200, Primaset® BA-230s, Primaset® PT-30, Primaset® PT-30s, Primaset® LECY, Primaset® PT-60, and Primaset® PT-60s all available from Lonza Ltd. Basel, Switzerland.

The preferred range of cyanate ester in the composition (expressed as the weight of the cyanate ester monomer versus the weight of the other organic components excluding the aprotic solvent of the composition) is 5 wt. % to 75 wt. %, more preferred 10 wt. % to 50 wt. %, and most preferred 15 wt. % to 40 wt. %.

In various embodiments, the composition of the present disclosure can further include an epoxy resin. For the various embodiments, examples of epoxy resins can include, but are not limited to, those selected from halogen-free epoxies, phosphorus-free epoxies, epoxy novolac resins and mixtures thereof, including, but not limited to D.E.N. 438, D.E.R. 330 (D.E.N. and D.E.R. are trademarks of The Dow Chemical Company), epoxy functional polyoxazolidone containing compounds, cycloaliphatic epoxies, glycidyl methacrylate ethers/styrene copolymers, the reaction product of liquid epoxy resins (LER) and tetra bromo bisphenol A (TBBA) resins, DER 539, and the reaction product of DEN 438 and 3,4,5,6-dibenzo-1,2-oxaphosphane-2-oxide (DOP) resins. Additional examples include the halogen-free epoxy-terminated polyoxazolidone resins disclosed in U.S. Pat. No. 5,112,932.

Additional epoxy compounds include trisepoxy compounds, epoxidized bisphenol A novolacs, bismaleimide-triazine resins (BT-resins), mixtures of epoxy resins and BT-resins (BT-epoxy), cresol epoxy novolacs, dicyclopentadiene phenol epoxy novolacs, glycidyl ethers of: tetraphenylethane, resorcinol, catechol, bisphenol, bisphenol-A, bisphenol AP (1,1-bis(4-hydroxyphenyl)-1-phenyl ethane), bisphenol F, bisphenol K, tetrabromobisphenol A, phenol-formaldehyde novolac resins, hydroquinone, alkyl substituted phenol-formaldehyde resins, phenol-hydroxybenzaldehyde resins, cresol-hydroxybenzaldehyde resins, dicyclopentadiene-phenol resins, dicyclopentadiene-substituted phenol resins tetramethylbiphenyl, tetramethyl-tetrabromobiphenyl, tetramethyltribromobiphenyl, tetrachlorobisphenol A, and combinations thereof.

For the various embodiments, the epoxy novolac resin (sometimes referred to as an epoxidized novolac resin, a term which is intended to embrace both epoxy phenol novolac resins and epoxy cresol novolac resins) have the general chemical structural formula illustrated by Formula (XXVII) as follows:

Formula (XXVII)

wherein "R4" is hydrogen or an alkyl having 1 to 3 carbon atoms, for example, methyl; and "r" is 0 or an integer from 1 to 10. "n" preferably has an average value of from 0 to 5. The preferred epoxy novolac resin is when "R4" is a hydrogen atom in the above Formula (XXVII).

Epoxy novolac resins (including epoxy cresol novolac resins) are commercially available, for example under the trade names D.E.N. (trademark of The Dow Chemical Company), and QUATREX and TACTIX 742 (trademarks of Ciba Geigy). The materials of commerce generally comprise mixtures of various species of the above Formula (XXIV) and a convenient way of characterizing such mixtures is by reference to the average, r', of the values of r for the various species. Preferred epoxy novolac resins for use in accordance with the present disclosure are those in which r' has a value of from 0 to 10, more preferably from 1 to 5.

The preferred range of epoxy resin in the composition (expressed as the weight of the epoxy resin versus the weight of the other organic components excluding the aprotic solvent of the composition) is 10 wt. % to 80 wt. %, more preferred 20 wt. % to 60 wt. %, and most preferred 25 wt. % to 50 wt. %. For the various embodiments, the composition can contains a weight ratio of epoxy resin to (:) cyanate ester of from 0.8:1.0 to 1.5:1.0, preferably from 1.0:1.0 to 1.4:1.0 and more preferably from 1.1:1.0 to 1.3:1.0.

In various embodiments, the composition of the present disclosure further includes a maleimide resin. Examples of suitable maleimide resins include, but are not limited to, those maleimide resins having at least one maleimide group per molecule. Additional examples include, but are not limited to, toluenebismaleimide, phenylmaleimide, 4,4'-bismaleimidodiphenylmethane and combinations thereof.

The preferred range of maleimide in the composition (expressed as the weight of the maleimide-containing monomer versus the weight of the other organic components excluding the aprotic solvent of the composition) is 0 wt. % to 50 wt. %, more preferred 10 wt. % to 40 wt. %, and most preferred 10 wt. % to 30 wt. %.

For the various embodiments, the epoxy resin and the maleimide can undergo a Masterblend reaction to form a Masterblend compound. For the various embodiments, the Masterblend compound can be mixed with the phosphorous-containing compound the cyanate ester and the aprotic solvent to form the composition of the present disclosure. In an additional embodiment, the Masterblend compound can be formed with the epoxy resin, the maleimide and the phosphorous-containing compound before mixing with the cyanate ester and the aprotic solvent form the composition of the present disclosure.

For the various embodiments, the Masterblend reaction to form the Masterblend compound includes reacting at least the epoxy resin and the maleimide resin (an optionally the phosphorous-containing compound) at a temperature of 50 to 220° C. for a time of 10 to 120 minutes. For the various embodiments, a temperature of 130° C. for a time of 25 to 45 minutes is sufficient to form the Masterblend compound.

The Masterblend compound from at least the epoxy resin and the maleimide resin can then be blended and/or mixed with the cyanate ester and the aprotic solvent (which may or may not contain the phosphorous-containing compound), along with one or more of the additional components as are discussed herein, to form the composition of the present disclosure. For the various embodiments, forming the Masterblend compound make the resulting form of the epoxy resin and the maleimide resin more soluble in the aprotic solvent than the individual compounds of the epoxy resin and the maleimide resin themselves would be.

The compositions of the present disclosure may also be used with one or more of a thermosetting resin. For the various embodiments, compositions of the present disclosure can be blended and/or mixed with at least one thermosetting resin. For the various embodiments, the thermosetting resin can either be reactive or non-reactive with the composition of the present disclosure. Examples of such thermosetting resins include, but are not limited to, epoxy resins (as described herein), polyepoxide resins, cyanate esters, dicyanate esters, polycyanate esters, cyanate aromatic esters, and combinations thereof.

For the various embodiments, examples of the thermosetting resin may include at least one epoxy resin and/or polyepoxide resin, where combinations of one or more of the epoxy resins and one or more of the polyepoxide resins are possible. Examples of polyepoxide resins include, but are not limited to, those described in U.S. Pat. No. 6,645,631. The polyepoxide resins disclosed in U.S. Pat. No. 6,645,631 are the reaction products of an epoxy compound containing at least two epoxy groups and a reactive phosphorus-containing compound such as 3,4,5,6-dibenzo-1,2-oxaphosphane-2-oxide (DOP), or 10-(2',5'-dihydroxyphenyl)-9,10-dihydro-9-oxa-10-phosphaphenanthrene-10-oxide (DOP-HQ).

A Lewis acid may also be employed in the compositions that include an epoxy resin. The Lewis acid may include, for example, one or a mixture of two or more halides, oxides, hydroxides and alkoxides of zinc, tin, titanium, cobalt, manganese, iron, silicon, aluminum, and boron. Examples of such Lewis acids, and anhydrides of Lewis acids include boric acid, metaboric acid, optionally substituted boroxines (such as trimethoxy boroxine, trimethyl boroxine or triethyl boroxine), optionally substituted oxides of boron, alkyl borates, boron halides, zinc halides (such as zinc chloride) and other Lewis acids that tend to have a relatively weak conjugate base.

Embodiments of the present disclosure also provide for compositions that further include at least one thermoplastic polymer. Typical thermoplastic polymers include, but are not limited to, polymers produced from vinyl aromatic monomers and hydrogenated versions thereof, including both diene and aromatic hydrogenated versions, including aromatic hydrogenation, such as styrene-butadiene block copolymers, polystyrene (including high impact polystyrene), acrylonitrile-butadiene-styrene (ABS) copolymers, and styrene-acrylonitrile copolymers (SAN); polycarbonate (PC), ABS/PC compositions, polyethylene, polyethylene terephthalate, polypropylene, polyphenylenoxides (PPO), hydroxy phenoxy ether polymers (PHE), ethylene vinyl alcohol copolymers, ethylene acrylic acid copolymers, polyolefin carbon monoxide interpolymers, chlorinated polyethylene, polyphenylene ether, polyolefins, olefin copolymers, cyclic olefin copolymers, and combinations or blends thereof.

In an additional embodiment, the compositions of the present disclosure can also include at least one reactive and/or non-reactive thermoplastic resin. Examples of such thermoplastic resins include, but are not limited to, polyphenylsulfones, polysulfones, polyethersulfones, polyvinylidene fluoride, polyetherimide, polypthalimide, polybenzimidazole, acrylics, phenoxy, and combinations or blends thereof.

For the various embodiments, the composition of the present disclosure can be blended with the thermoplastic resin to form a hybrid crosslink network. Preparation of the compositions of the present disclosure can be accomplished by suitable mixing means known in the art, including dry blending the individual components and subsequently melt mixing, either directly in the extruder used to make the finished article or pre-mixing in a separate extruder. Dry blends of the compositions can also be directly injection molded without pre-melt mixing.

When softened or melted by the application of heat, the composition of the present disclosure and the thermoplastic resin can be formed or molded using conventional techniques such as compression molding, injection molding, gas assisted injection molding, calendaring, vacuum forming, thermoforming, extrusion and/or blow molding, alone or in combination. The composition of the present disclosure and the thermoplastic resin may also be formed, spun, or drawn into films, fibers, multi-layer laminates or extruded sheets, or can be compounded with one or more organic or inorganic substances.

Embodiments of the present disclosure also provide for compositions of the present disclosure and at least one of a polyurethane, a polyisocyanate, a benzoxazine ring-containing compound, an unsaturated resin system containing double or triple bonds, and combinations thereof.

The compositions of the present disclosure described above may also optionally make use of at least one catalyst. Examples of suitable curing catalysts include imidazoles such as 1-methylimidazole, 2-methylimidazole, 2-phenylimidazole, ethylmethylimidazole, phosphines such as triphenylphosphine, and metal catalysts conventionally used to cure cyanates: zinc naphthenate, zinc octoate, zinc ethylhexonate, zinc hexoate, as well as the manganese, copper, and other transition element (Groups 4-12 that are headed by the first row elements titanium through zinc) of these same anions.

Because of their unique combination of properties, the compositions of the present disclosure may be used in a variety of ways. For example, the composition can be used as a varnish and/or in a prepreg, as well as in shaped articles, reinforced compositions, laminates, electrical laminates, coating, molded articles, adhesives, and/or composite products. In addition, the compositions of the disclosure can be used for various purposes in the form of a dried powder, pellets, a homogeneous mass, impregnated products or/or compounds.

For the various embodiments, the compositions of the present disclosure can be used as, among other things, a varnish for use in laminates (e.g., electrical laminates) and other composite applications. Surprisingly, it was found that when the aliphatic alcohols in the reaction products that included the phosphorous-containing compound were not removed prior to forming the composition, the varnishes formed with those compositions would interfere with several key properties of the varnish. Such properties included both the viscosity stability of the varnish and the glass transition temperature of the cured varnish. Embodiments of the present disclosure, however, remove the aliphatic alcohols from the reaction products of the phosphorous-containing compound by forming them into a dry solid (thereby removing the aliphatic alcohols) prior to suspending the phosphorous-containing compound in the aprotic solvent for the composition. The resulting compositions of the present disclosure are then able to provide varnishes with improved thermal properties along with a V-0 Flammability Classification (UL 94, UL®). For the various embodiments, a viscosity of the composition increases less than 100% as measured by Gardner Bubble Viscosity at a temperature of 23° C. in at least 3 days.

A variety of additional additives may be added to the compositions of the present disclosure. Examples of these additional additives include fibrous reinforcement, fillers, pigments, dyestuffs, thickening agents, wetting agents, lubricants, flame-retardants, stabilizers, flow modifiers, UV light blockers, fluorescent additives, other organic or inorganic additives, and the like. Suitable fibrous and/or particulate reinforcing materials include silica, alumina trihydrate, aluminum oxide, aluminum hydroxide oxide, metal oxides, nano tubes, glass fibers, quartz fibers, carbon fibers, boron fibers, Kevlar fibers and Teflon fibers, among others. A size range for the fibrous and/or particulate reinforcing materials can include 0.5 nm to 100 µm. For the various embodiments, the fibrous reinforcing materials can come in the form of a mat, cloth or continuous fibers.

The fibrous or reinforcing material is present in the composition in an amount effective to impart increased strength to the composition for the intended purpose, generally from 10 to 70 wt. %, usually from 30 to 65 wt. %, based on the weight of the total composition. The laminates of the disclosure can optionally include one or more layers of a different material and in electrical laminates this can include one or more layers of a conductive material such as copper or the like. When the composition of this disclosure is used for producing molded articles, laminated articles or bonded structures, the curing is desirably effected under pressure.

In a partially cured state, the fibrous reinforcement impregnated with the composition of the present disclosure can be subjected to a relatively mild heat treatment ("B-staged") to form a "prepreg." The prepreg can then subjected to elevated temperature and pressure so as to more completely cure the composition to a hard, inflexible state. A plurality of prepregs can be layered and cured to form a laminate having utility in circuit boards.

Embodiments of the compositions may also include at least one of a synergist to help improve the flame out ability of the cured composition. Examples of such synergists include, but are not limited to, magnesium hydroxide, zinc borate, metallocenes and combinations there. In addition, embodiments of the compositions may also include adhesion promoters, such as modified organosilanes (epoxidized, methacryl, amino), acetylacetonates, sulfur containing molecules and combinations thereof. Other additives can include, but are not limited to, wetting and dispersing aids such as modified organosilanes, Byk® 900 series and W 9010 (Byk-Chemie GmbH), modified fluorocarbons and combinations thereof; air release additives such as Byk® A530, Byk® A525, Byk® A555, and Byk® A 560 (Byk-Chemie GmbH); surface modifiers such as slip and gloss additives; mold release agents such as waxes; and other functional additives or prereacted products to improve polymer properties such as isocyanates, isocyanurates, cyanate esters, allyl containing molecules or other ethylenically unsaturated compounds, acrylates and combinations thereof.

For the various embodiments, a resin sheet can be formed from the compositions of the present disclosure. In one embodiment, a plurality of sheets can be bonded together to form a laminated board, where the sheets comprise at least one of the resin sheet. The compositions can also be used to form a resin clad metal foil. For example, a metal foil, such as a copper foil, can be coated with the compositions of the present disclosure. The various embodiments also include a multi layer board that can be prepared by coating a laminated substrate with the compositions of the present disclosure.

The compositions of the disclosure comprise one or more components which can each be used in any desired form such as solid, solution or dispersion. These components are mixed in solvent or in the absence of a solvent to form the compositions of this disclosure. For example, the mixing procedure comprises mixing solutions of the phosphorous containing compound and one or more of the formulation components or either separately or together in a suitable aprotic solvent, such as for example, ketones such as methyl ethyl ketone, chlorinated hydrocarbons such as methylene chloride, ethers and the like, and homogenizing the resulting mixed solution at room temperature or at an elevated temperature below the boiling point of the solvents to form a composition in the form of a solution. When homogenizing these solutions at room temperature or at an elevated temperature, some reactions may take place between the constituent elements. So long as the resins components are maintained in the state of solution without gelation, such reactions do not particularly affect the operability of the resulting composition in, for example, a bonding, coating, laminating or molding operation.

For the various embodiments, the compositions of the present disclosure can applied to a substrate as a coating or adhesive layer. Alternatively, the compositions of the present disclosure can be molded or laminated in the form of powder, pellet or as impregnated in a substrate such as a fibrous reinforcement. The compositions of the present disclosure can then be cured by the application of heat.

The heat necessary to provide the proper curing conditions can depend on the proportion of components constituting the composition and the nature of the components employed. In general, the composition of this disclosure may be cured by heating it at a temperature within the range of 0° C. to 300° C., preferably 100° C. to 250° C., although differing according to the presence of a catalyst or its amount, or the types of the components in the composition. The time required for heating can be 30 seconds to 10 hours, where the exact time will differ according to whether the composition is used as a thin coating or as molded articles of relatively large thickness or as laminates or as matrix resins for fiber reinforced composites, particularly for electrical and electronic applications, e.g., when applied to an electrically nonconductive material and subsequently curing the composition.

The following examples illustrate how one may practice the present disclosure. Those who are skilled in this field of technology are capable of practicing the full scope of the present disclosure via procedures analogous to those described below.

EXAMPLES

The following examples are given to illustrate, but not limit, the scope of this disclosure.

Materials
D.E.N.™ 438EK85 (Epoxy novolak resin, The Dow Chemical Company)
Bis(4-maleimidophenyl)methane (MDAB, maleimide available from Aldrich)
N-Phenyl maleimide (PMI, maleimide available from Aldrich)
Primaset® BA-230s (cyanate ester, Lonza Group, Switzerland)
Primaset® PT-30s (cyanate ester, Lonza Group, Switzerland)
Zn-hexanoate catalyst (available from Aldrich)
Methyl ethyl ketone (MEK) (available from Aldrich)
Anhydrous dichloromethane (available from Aldrich)
9,10-dihydro-9-oxa-10-phosphaphenanthrene-10-oxide (H-DOP, "Sanko-HCA," which is commercially available from Sanko of Japan and "Struktol Polydis™ PD 3710," which is commercially available from Schill & Seilacher of Germany).
XZ-92741 (Reaction products that contain phosphorous-containing compound DOP-BN in solution containing an aliphatic alcohol (Dowanol™ PM and n-butanol) available from The Dow Chemical Company)
Nitrogen (available from Air Products)
Cyanogen bromide (available from Aldrich)
Triethylamine (available from Aldrich)
Dichloromethane (available from Aldrich)
Granular anhydrous sodium sulfate (available from Aldrich)
Bisphenol A dicyanate (available from Lonza Group, Switzerland)
4,4'-bismaleimidodiphenylmethane, (commercial grade, Compimide MDAB, Evonik Degussa GmbH).
N-phenylmaleimide (available from Aldrich)
2-butanone (methyl ethyl ketone—solvent) (available from Aldrich)
n-Butanol (available from Aldrich)
Dowanol™ PM (propylene glycol methyl ether, The Dow Chemical Company).

Isolation of Phosphorous-Containing Compound DOP-BN from XZ-92741

Phosphorous-containing compound DOP-BN was isolated from XZ-92741 by rotoevaporation under vacuum using a hot water bath (60° C.). The resulting solid after rotoevaporation was placed in a vacuum oven at 90° C. for 16 hours to isolate and remove n-butanol from the phosphorous-containing compound.

Figure 1:
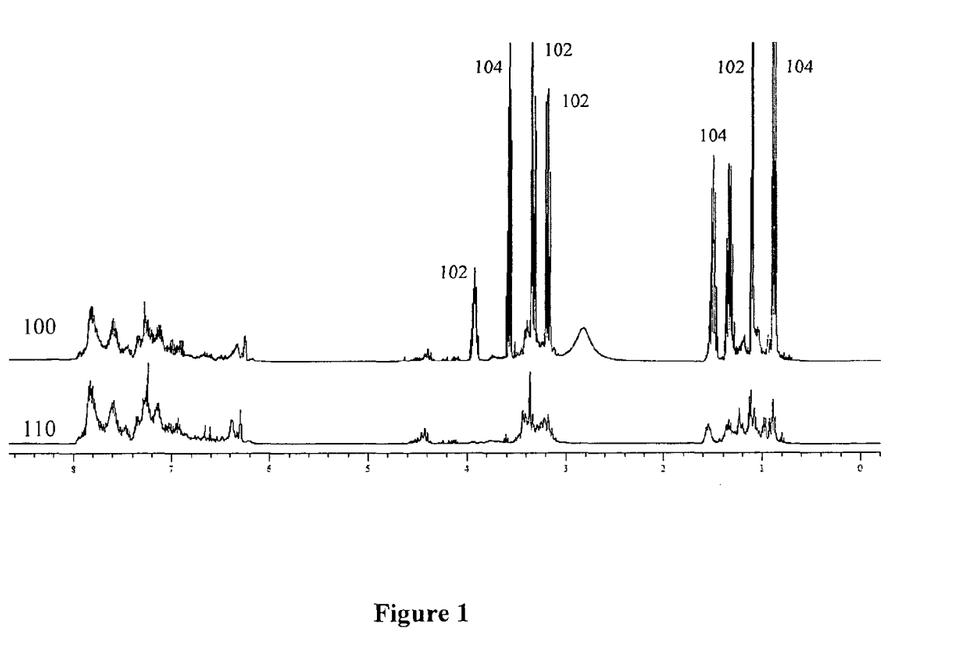
FIG. 1 is a $^1$H NMR Spectra of XZ-92741 and phosphorous-containing compounds that include DOP-BN according to the present disclosure.

FIG. 1 provides an NMR spectrum of XZ-92741 and the resulting solid after rotoevaporation and subsequent treatment in a vacuum oven at 90° C. for 16 hours. As shown, the $^1$H NMR signal 100 in FIG. 1 represents the XZ-92741, and the $^1$H NMR signal 200 represents the phosphorous-containing compound DOP-BN (in deuterated chloroform CDCl$_3$) isolated from XZ-92741. The data of FIG. 1 suggests that that most of the Dowanol™ PM (signals adjacent 102) and n-butanol (signals adjacent 104) were removed from XZ-92741.

Figure 2:
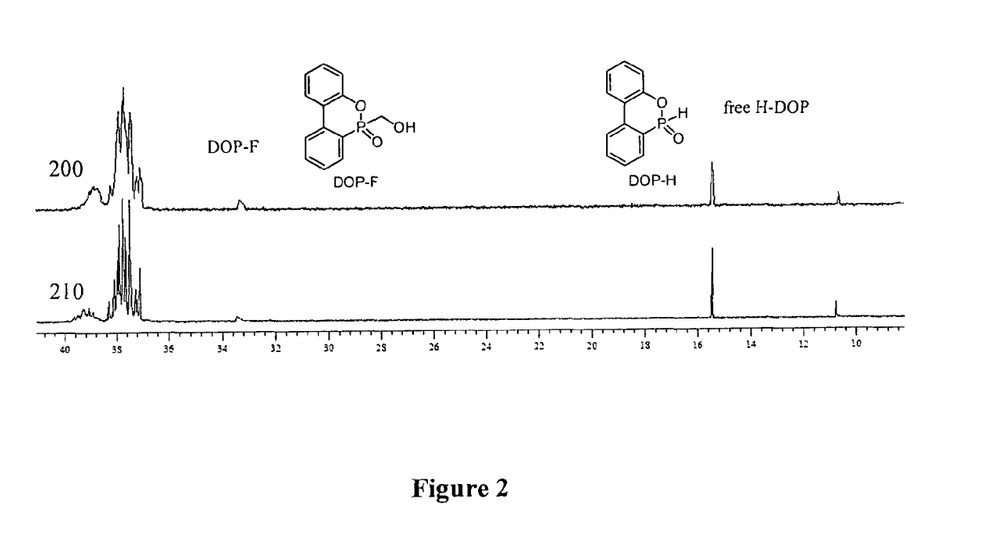
FIG. 2 is a $^{31}$P NMR Spectra of XZ-92741 and phosphorous-containing compounds that include DOP-BN according to the present disclosure.

FIG. 2 provides additional data regarding the phosphorous-containing compounds from the XZ-92741. FIG. 2 provides an NMR spectrum with a $^{31}$P signal 200 of the phosphorous-containing compound DOP-BN (in CDCl$_3$) isolated from XZ-92741, and a $^{31}$P signal 210 of XZ-92741, where the $^{31}$P signal 210 of XZ-92741 appears to be broader than the $^{31}$P signal 200 of the phosphorous-containing compound DOP-BN. This could be the result of differences in concentration and viscosity of the NMR samples and the interference of alcohol solvents in XZ92741.

Examples of Compositions

Comparative Examples A through C and Example 1 were prepared at room temperature (23° C.) using the weight percents given in Table 1, below. The compositions of each of the Examples contained 70 wt. % solids. The components in Table 1 were weighed into a 25 mL glass vial (solid components first followed by solvent-containing materials) and mixed at room temperature using a shaker for 1-2 hr.

TABLE 1

Compositions of Comparative Examples A, B and C and Example 1

|  |  | Comparative Example A | Comparative Example B | Comparative Example C | Example 1 |
|---|---|---|---|---|---|
| D.E.N.™ 438EK85[a] | (g) | 5.31 | 4.94 | 4.85 | 4.85 |
| Primaset® BA-230s[b] | (g) | 4.08 | 3.80 | 3.57 | 3.57 |
| MDAB | (g) | 1.88 | 1.75 | 1.49 | 1.49 |
| XZ-92741[c] | (g) | 1.91 | 3.09 | 4.02 | — |
| DOP-BN in MEK[d] | (g) | — | — | — | 4.02 |
| MEK[e] | (g) | 1.82 | 1.42 | 1.07 | 1.07 |
| Total weight | (g) | 15.00 | 15.00 | 15.00 | 15.00 |
| Solids content | (wt. %) | 70 | 70 | 70 | 70 |
| Catalyst[f] | (g) | 0.02 | 0.02 | 0.02 | 0.02 |
| Phosphorous content[g] | (wt. %) | 1.0 | 1.5 | 2.0 | 2.0 |

[a]85 wt. % solids in MEK.
[b]75 wt. % solids in MEK.
[c]Dow product containing 55 wt. % DOP-BN in a mixture of Dowanol ™ PM and n-butanol.
[d]Solids content: 55 wt. %.
[e]Additional MEK solvent, not including the amount present in some of the components.
[f]Zn-hexanoate (5 wt. % in MEK).
[g]This is a calculated value based on total solids.

TABLE 2

Components[a] and Functional Group Ratios[b] of Compositions with 1.0, 1.5 and 2.0 wt. % Phosphorous on Solids Basis

|  | Phosphorus Content (wt. %)[a] | | |
|---|---|---|---|
|  | 1.0 Comparative Example A | 1.5 Comparative Example B | 2.0 Comparative Example C and Example 1 |
| D.E.N.™ 438EK85—Epoxy Novolak Resin | 43 | 40 | 39 |
| MDAB—Maleimide | 18 | 17 | 14 |

TABLE 2-continued

Components[a] and Functional Group Ratios[b] of Compositions with 1.0, 1.5 and 2.0 wt. % Phosphorous on Solids Basis

| | Phosphorus Content (wt. %)[a] | | |
|---|---|---|---|
| | 1.0 Comparative Example A | 1.5 Comparative Example B | 2.0 Comparative Example C and Example 1 |
| Primaset ® BA-230s—Cyanate Ester | 29 | 27 | 26 |
| DOP-BN—Phosphorous Containing Compound | 10 | 16 | 21 |
| Zn-hexanoate—Catalyst | 0.01 | 0.01 | 0.01 |
| E/CE | 1.63 | 1.63 | 1.70 |
| CE/OH | 11.46 | 6.59 | 4.75 |
| E/OH | 18.66 | 10.74 | 8.10 |
| E/MI | 2.39 | 2.39 | 2.75 |
| CE/MI | 1.46 | 1.46 | 1.61 |

[a]Values are weight % of total solids.
[b]E: epoxy, CE: cyanate ester, OH: phenolic hardener, MI: maleimide.

Viscosity Stability of Compositions

Comparative Examples C through H and Example 1 were prepared at room temperature (23° C.) using the weight percents given in Table 3, below. The compositions of each of the Examples contained 70 wt. % solids. As before, the solid materials were weighed into a 25 mL vial followed by the solvent-containing materials and mixed at room temperature using a shaker for 1-2 hr.

Viscosity of the Compositions was measured using Gardner Bubble Viscosity according to ASTM D1725 test protocol.

Differential scanning calorimetry (DSC) measurements were carried out using a TA Instruments DSC Q-100 instrument. Glass transition temperature (Tg) was determined using the "half extrapolated tangents" function (T) of the second heating cycle (ramp to 270° C. at 10° C./min). The Compositions were cured at 220° C. for 1 h for DSC measurements.

Decomposition temperature (Td), defined as the temperature at 5% weight loss, was determined using a TA Instruments TGA Q-50 instrument. Samples were heated to 550° C. at 10° C./min.

Glass transition temperature (Tg) of cured hand-layups was measured using a TA Instruments RSA III dynamic mechanical analyzer (DMA). Tg was determined from max tan δ. Sample preparation for this measurement consisted of impregnation of a sheet of woven glass with a composition and subsequent curing for 2 min at 125° C., 5 min at 170° C. and 90 min at 220° C.

Thermomechanical analysis (TMA) measurements were conducted on a TA Instruments Q-400 Thermomechanical Analyzer. The following tests were conducted using IPC-TM-650 standard procedures: stroke cure reactivity (used to measure Gel time), % volatiles in prepreg, T-288, CTE (coefficient of thermal expansion), Cu peel, and water uptake (IPC—Institute of Printed Circuits).

TABLE 3

Viscosity Stability of Compositions with the Phosphorous-Containing Compound in Solution with and without Aliphatic Alcohol

| | | Compar. Example C | Example 1 | Compar. Example D | Compar. Example E | Compar. Example F | Compar. Example G | Compar. Example H |
|---|---|---|---|---|---|---|---|---|
| Solvent(s) for DOP-BN[a] | | PM/BuOH | MEK | PM[b] | PM/MEK 1:1 (wt ratio) | PM/BuOH 30 wt. % BuOH | PM/BuOH 20 wt. % BuOH | PM/BuOH 12 wt. % BuOH[c] |
| D.E.N. ™ 438EK85[d] | (g) | 4.85 | 4.85 | 4.85 | 4.85 | 4.85 | 4.85 | 4.85 |
| Primaset ® BA-230s[e] | (g) | 3.57 | 3.57 | 3.57 | 3.57 | 3.57 | 3.57 | 3.57 |
| MDAB | (g) | 1.49 | 1.49 | 1.49 | 1.49 | 1.49 | 1.49 | 1.49 |
| XZ-92741[f] | (g) | 4.02 | — | — | — | — | — | — |
| DOP-BN sol.[g] | (g) | — | 4.02 | 4.02 | 4.02 | 4.02 | 4.02 | 4.02 |
| MEK[h] | (g) | 1.07 | 1.07 | 1.07 | 1.07 | 1.07 | 1.07 | 1.07 |
| Total weight | (g) | 15.00 | 15.00 | 15.00 | 15.00 | 15.00 | 15.00 | 15.00 |
| Solids content | (wt. %) | 70 | 70 | 70 | 70 | 70 | 70 | 70 |
| Catalyst[i] | (g) | 0.02 | 0.02 | 0.02 | 0.02 | 0.02 | 0.02 | 0.02 |
| Phosphorous content[j] | (wt. %) | 2.0 | 2.0 | 2.0 | 2.0 | 2.0 | 2.0 | 2.0 |
| Gel time at 171° C. | (sec) | 307 | 345 | 350 | 335 | 295 | 320 | 340 |
| $T_g$ by DSC | (° C.) | 196 | 207 | 202 | 202 | 204 | 203 | 206 |
| $T_d$ by TGA | (° C.) | 357 | 361 | 357 | 357 | 354 | 356 | 358 |
| Viscosity[k] at Mixing | | D | B | E | C | D | D | D |

TABLE 3-continued

Viscosity Stability of Compositions with the Phosphorous-Containing Compound in Solution with and without Aliphatic Alcohol

|  |  | Compar. Example C | Example 1 | Compar. Example D | Compar. Example E | Compar. Example F | Compar. Example G | Compar. Example H |
|---|---|---|---|---|---|---|---|---|
| Viscosity at | 1 day (d) | H | C | — | — | K | K | I |
|  | 3 d | S | — | H | D | V | V | T |
|  | 4 d | — | — | K | F | — | — | — |
|  | 6 d | — | D | K | F | — | — | — |
|  | 16 d | — | E | — | — | — | — | — |

[a]The solvent or solvent mixture used to prepare the 55 wt. % DOP-BN solution from solid DOP-BN.
[b]Dowanol™ PM.
[c]BuOH content is similar to that of XZ92741.
[d]85 wt. % solids in MEK.
[e]75 wt. % solids in MEK.
[f]Dow product containing 55 wt. % DOP-BN in a mixture of Dowanol™ PM and n-butanol.
[g]Solids content: 55 wt. %.
[h]Additional MEK solvent, not including the amount present in some of the components.
[i]Zn-hexanoate (5 wt. % in MEK).
[j]Based on total solids.
[k]Gardner bubble viscosity (letter, viscosity in centi-Stokes: A; 53.6, B; 68.8; C, 92.7; D, 102.9; E, 122.7; F, 151.9; G, 160.0; H, 210.8; I, 224.2; J, 268.2; K, 287.9; L, 302.3; M; 335.4; N, 345.2; O, 377.9; P, 408.8; Q, 441.8; R, 467.4; S, 517.7; T, 547.2; U, 665.9; V, 889.2)
"—" Indicates measurement not made.

The data in Table 3 illustrates the effect of aliphatic alcohol in the composition of the present disclosure. For example, Table 3 shows that the Phosphorous-Containing Compound showed greater viscosity stability when in MEK as compared to those solutions with Dowanol™ PM and/or n-butanol. As such, it is believed that at least n-butanol and Dowanol™ PM both contribute to the decrease in viscosity stability of the Phosphorous-Containing Compound and the compositions of the present disclosure.

The data shown in Table 4 indicates that the compositions that include maleimide have both a good viscosity stability and good Tg values.

Masterblend compounds provided in Table 5 and 6, below, were prepared by stirring the epoxy novolak resin D.E.N.™ 438EK85 with the respective maleimide at 130° C. for 45 minutes under a nitrogen atmosphere. A deep red solution formed. Heating was stopped and MEK was added drop-wise under reflux to cool and dilute the Masterblend compound to room temperature (23° C.). When at room temperature, a

TABLE 4

Compositions[a] with MDAB, PMI and without Maleimides

|  |  | Example 1 | Example 2 | Example 3 | Example 4 |
|---|---|---|---|---|---|
| Maleimide component |  | MDAB | MDAB:PMI 1:3 (wt ratio) | PMI | None |
| D.E.N.™ 438EK85[a] | (g) | 4.85 | 9.70 | 4.85 | 4.85 |
| Primaset® BA-230s[b] | (g) | 3.57 | 7.14 | 3.57 | 3.57 |
| MDAB | (g) | 1.49 | 0.74 | — | — |
| PMI | (g) | — | 2.24 | 1.49 | — |
| DOP-BN Solution[d] | (g) | 4.02 | 8.04 | 4.02 | 4.02 |
| MEK[e] | (g) | 1.07 | 2.14 | 1.07 | 1.07 |
| Total weight | (g) | 15.00 | 30.00 | 15.00 | 13.51 |
| Solids content | (wt. %) | 70 | 70 | 70 | 67 |
| Solids wt ratio epoxy:cyanate |  | 1.15:1.00 | 1.15:1.00 | 1.15:1.00 | 1.15:1.00 |
| Catalyst[f] | (g) | 0.02 | 0.04 | 0.02 | 0.02 |
| Phosphorous content[g] | (wt. %) | 2.0 | 2.0 | 2.0 | 2.3 |
| Composition appearance |  | Suspension | Solution | Solution | Solution |
| Gel time at 171° C. | (sec) | 345 | 375 | 390 | 285 |
| $T_g$ by DSC | (° C.) | 207 | 197 | 190 | 202 |
| $T_g$ by DMA/RSA (max tan δ) | (° C.) | 223 | 209 | 210 | 210 |
| $T_d$ by TGA | (° C.) | 361 | 351 | 348 | 357 |
| Gardner viscosity at mixing[h] |  | A | <A | <A | <A |
| Viscosity[h] at | 11 days (d) | — | — | — | B |
|  | 14 d | C | A/B | A/B | — |
|  | 41 d | F | D | C | — |

[a]85 wt. % solids in MEK.
[b]75 wt. % solids in MEK.
[c]Dow product containing 55 wt. % DOP-BN in a mixture of Dowanol™ PM and n-butanol.
[d]Solids content: 55 wt. %.
[e]Additional MEK solvent, not including the amount present in some of the components.
[f]Zn-hexanoate (5 wt. % in MEK).
[g]Based on total solids.
[h]Samples for viscosity measurements did not contain the catalyst component.

given portion of the Masterblend compound was mixed with the other components of the composition as follows.

TABLE 5

BT formulations with Epoxy/Maleimide Masterblends

|  |  | Example 5 | Example 6 |
|---|---|---|---|
| Maleimide(s) used in Masterblend |  | MDAB:PMI 3:2 (wt ratio) | MDAB |
| Primaset ® BA-230s | (g) | 3.57 | 3.57 |
| DOP-BN Solution | (g) | 4.02 | 4.02 |
| Masterblend[a,b] | (g) | 6.34[a] | 7.41[b] |
| MEK[c] | (g) | 1.07 | — |
| Total weight | (g) | 15.00 | 15.00 |
| Solids content | (wt. %) | 70 | 70 |
| Catalyst[d] | (g) | 0.02 | 0.02 |
| Phosphorous content[e] | (wt. %) | 2.00 | 2.00 |
| Gardner viscosity[f] at mixing |  | <A | A/B |
| Viscosity[f] at | 10 days (d) | — | E |
|  | 14 d | D | — |
| gel time at 171° C. | (sec) | 323 | 290 |
| $T_g$ by DSC | (° C.) | 203 | 210 |
| $T_d$ by TGA | (° C.) | 348 | 354 |

[a]Masterblend: D.E.N. ™ 438EK85 (66 g), {MDAB (14 g):PMI (9.6 g) [6:4]}. MEK (12 g) was added under reflux and the Masterblend was allowed to cool to 25° C.
[b]Masterblend: D.E.N. ™ 438EK85 (132 g), MDAB (48 g). MEK (58 g) was added under reflux and the Masterblend was allowed to cool to 25° C.
[c]Additional MEK solvent, not including the amount present in some of the components.
[d]Zn-hexanoate (5 wt. % in MEK).
[e]Based on total solids.
[f]Samples containing the catalyst component were used for viscosity measurements.

TABLE 6

DOP-BN Used in Masterblend with Epoxy and Maleimide Components

|  |  | Example 7 | Example 8 |
|---|---|---|---|
| Primaset ® BA-230s[a] | (g) | 3.57 | — |
| Primaset ® PT-30s[b] | (g) | — | 3.57 |
| Masterblend[c] | (g) | 11.43 | 11.43 |
| Total weight | (g) | 15.00 | 15.00 |
| Solids content | (wt. %) | 70 | 70 |
| Catalyst | (g) | 0.02 | 0.02 |
| Phosphorous content | (wt. %) | 2.00 | 2.00 |
| Composition appearance |  | solution | solution |
| gel time at 171° C | (sec) | 275 | 240 |
| $T_g$ by DSC | (° C.) | 206 | not observed |
| $T_d$ by TGA | (° C.) | 358 | 372 |
| Gardner viscosity[d] <24 hours |  | C | A |
| Viscosity[d] at | 3 days (d) | F | F/G |
|  | 5 d | G | G |
|  | 10 d | J | J |

[a]75 wt. % solids in MEK.
[b]Ca 80 wt. % solids in MEK.
[c]Masterblend preparation: D.E.N. ™ 438EK85 (132 g), MDAB (48 g) and solid DOP-BN (71 g) were heated at 130° C. for 45 minutes and MEK (115 g) was slowly added under reflux to cool and dilute the Masterblend.
[d]Samples for viscosity measurements did not contain the catalyst component.

Prepreg and Laminate Preparations

The Phosphorous-Containing Compound of Example 1, above, was impregnated into a glass cloth reinforcement substrate with a CS-718 finish available from JPS Industries, Inc. The impregnated substrate is passed through a Litzler pilot treater (built by C. A. Litzler in Cleveland, Ohio, USA) having a 4 meter vertical oven at an air temperature of approximately 170° C. and a winding speed of 4 meters per minute to form a prepreg. The resulting prepreg had a resin content of about 42 wt. % and a residual gel time of 90 seconds at 171° C.

The ideal gel time for a prepreg resin is 80-90 seconds. In case the gel time is longer, the treater has to be run at a lower speed. Finally, after all the necessary adjustments, 70-90 feet of prepreg was prepared. It is desired to get a smooth prepreg, because defects in the prepreg can translate into laminate defects. Laminates were pressed from eight prepreg layers with a press operating at high temperature and pressure (initial conditions: ramp to 113° C. at 5.5° C./min at 951.5 kPa, hold for 10 sec., ramp to 221° C. at 5.5° C./min at 517.1 kPa, hold for 10 sec., cool to room temperature at 8.3° C./min). After the press conditions were optimized to get an ideal laminate thickness of approximately 1.4 mm, thin copper sheets were placed above and below eight prepreg sheets and Cu-clad laminates were pressed.

The prepreg formed above was cut into eight samples (30 cm×30 cm samples) and then a laminate was formed from the prepreg samples as follows: eight layers of prepregs together with two layers of copper were pressed together at 190° C. for 90 minutes to obtain a laminate having a TMA thickness of about 1.48 mm. The laminate had a TMA Tg of about 163° C., a CTE of 40.2/241.9 ppm/° C. (below Tg/above Tg), and a T-288 greater than 60 minutes. The copper peel strength of the laminate was about 14.3 N/cm. The laminate passed the UL 94 flammability V-0 rating. The V-0 rating is more stringent, and is required for many consumer electronics applications.

We claim:

1. A method of forming a composition, comprising:
   reacting an epoxy resin and a maleimide to form a compound;
   removing an aliphatic alcohol from a phosphorous-containing compound from a reaction of:
   at least one organophosphorus compound having a group selected from the group of H—P=O, P—H and P—OH; and
   at least one compound having the following Formula (I):
   Formula I:
   $[R'(Y)_{m'}]_m (X—O—R'')_n$ wherein R' is an organic group; Y is a functional group selected from the group of hydroxy, carboxylic acid, carboxylate, acid anhydride, amine, —SH, —SO₃H, —CONH₂, —NHCOOR phosphinate, phosphate or a combination thereof; X is a hydrocarbylene group; R'' is a hydrogen or a hydrocarbyl group having from 1 to 8 carbon atoms, R is alkyl or aryl group having from 1 to 12 carbon atoms; and m', m and n are, independently, numbers equal to or greater than 1; and
   forming a mixture of the phosphorous-containing compound with a cyanate ester in an aprotic solvent; and
   forming the composition by combining the compound and the mixture.

2. The method of claim 1, where reacting the epoxy resin and the maleimide is done at a temperature of 130° C. for 25 to 45 minutes.

3. The method of claim 1, where the aprotic solvent is a ketone selected from the group of methyl ethyl ketone, methyl isobutyl ketone or a combination thereof.

4. The method of claim 1, wherein the maleimide is selected from the group of N-Phenyl maleimide, 4,4'-bismaleimidodiphenylmethane or a combination thereof.

5. The method of claim 1, where the maleimide is N-Phenyl maleimide.

6. The method of claim 1, where the epoxy resin and the cyanate ester have a weight ratio of from 0.8:1.0 to 1.5:1.0.

7. The method of claim 1, wherein the cyanate ester has been partially homopolymerized to form a trimer.

8. The method of claim 1, where the phosphorous-containing compound is DOP-BN formed from the reaction of 6H-Dibenz[c,e][1,2]oxaphosphorin 6-oxide and a resole.

* * * * *